(12) United States Patent
Bekkevold

(10) Patent No.: US 10,161,229 B2
(45) Date of Patent: Dec. 25, 2018

(54) SUBSEA CONNECTOR

(71) Applicant: FMC Kongsberg Subsea AS, Kongsberg (NO)

(72) Inventor: Knut Bekkevold, Hof (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 1174 days.

(21) Appl. No.: 14/369,670

(22) PCT Filed: Nov. 1, 2012

(86) PCT No.: PCT/EP2012/071651
§ 371 (c)(1),
(2) Date: Jun. 27, 2014

(87) PCT Pub. No.: WO2013/097966
PCT Pub. Date: Jul. 4, 2013

(65) Prior Publication Data
US 2014/0361534 A1    Dec. 11, 2014

(30) Foreign Application Priority Data

Dec. 27, 2011    (NO) ..................................... 20111776

(51) Int. Cl.
*F16L 37/12* (2006.01)
*E21B 43/013* (2006.01)
*E21B 33/038* (2006.01)

(52) U.S. Cl.
CPC .......... *E21B 43/013* (2013.01); *E21B 33/038* (2013.01); *F16L 37/12* (2013.01); *Y10T 29/49948* (2015.01)

(58) Field of Classification Search
CPC . E21B 43/013; F16L 37/12; F16L 1/26; F16L 37/62; D21B 43/013
(Continued)

(56) References Cited

U.S. PATENT DOCUMENTS 3,492,027 A * 1/1970 Herring ................. E21B 33/038
166/340
3,589,441 A * 6/1971 Brown .................. E21B 43/017
166/339

(Continued)

FOREIGN PATENT DOCUMENTS

WO    WO 2004/104365 A1    12/2004

*Primary Examiner* — Aaron M Dunwoody
*Assistant Examiner* — Fannie C Kee

(57) ABSTRACT

A connector includes a cylindrical body and a plurality of longitudinal latching fingers arranged around the body. Each finger has a first end region which includes a first latching structure, a second end region and an intermediate region. Each finger is pivotally supported at the intermediate region and is movable between a non-latching position and a latching position. An actuating device is operable to force the second end region of each finger towards the body by exerting a force on at least a portion of the second end region. The actuating device includes a force-imparting member which cooperates with a force-receiving region located on the second end region. The force-receiving region includes a first outer surface portion which is curved radially outwardly to define an apex and a trough, the latter being located between the apex and the intermediate region and configured to accommodate the force-imparting member.

16 Claims, 3 Drawing Sheets

(58) Field of Classification Search
USPC .................................... 285/320, 18, 33–34
See application file for complete search history.

(56) References Cited

U.S. PATENT DOCUMENTS

| | | | | |
|---|---|---|---|---|
| 3,897,823 | A | * | 8/1975 | Ahlstone ................ E21B 23/04 166/120 |
| 3,913,670 | A | * | 10/1975 | Ahlstone .............. E21B 33/043 166/182 |
| 4,526,406 | A | * | 7/1985 | Nelson ................. E21B 33/038 285/18 |
| 4,548,273 | A | * | 10/1985 | Leicht .................. E21B 33/043 166/123 |
| 4,708,376 | A | | 11/1987 | Jennings et al. |
| 5,282,655 | A | | 2/1994 | Marietta |
| 5,971,076 | A | | 10/1999 | Taylor et al. |
| 6,070,669 | A | | 6/2000 | Radi et al. |
| 8,016,042 | B2 | | 9/2011 | Spiering et al. |
| 2003/0151254 | A1 | | 8/2003 | Baugh |

\* cited by examiner

SUBSEA CONNECTOR

FIELD OF THE INVENTION

The invention relates to subsea connectors. More specifically, the invention concerns a connector having a plurality of latching fingers arranged around a cylindrical body. The invention also concerns a method of operating a connector.

BACKGROUND OF THE INVENTION

Collet connectors are commonly used to interconnect subsea equipment, for example a spool body and a wellhead hub, or a pipeline end and a manifold.

The state of the art includes U.S. Pat. No. 4,708,376, which discloses a collet-type connector having an upper body with a plurality of collet segments, a cam ring movable relative to the upper body member in order to move the collet segments into a detachable connection of the connector to a subsea wellhead. The cam ring and collet segments have sets of camming surfaces whereby a first set cooperate to pivot the collet segments initially towards the wellhead and whereby a second set serves to urge the collet segments further to clamp the connector to the subsea wellhead. When the second set of camming surfaces are in operation, the first set no longer function to rotate the collet segments, thus reducing the power requirement for urging the collet segments into clamping engagement to only one set at a time, even though both sets together serve to aid in holding the collet segments in clamping engagement with the wellhead after final engagement. When executing the connection, one set of camming surfaces initially serves to hold the collet segments in a conical orientation to facilitate positioning the connector over the wellhead and, secondly, together with the complementary ledges to form a load path between the collet segments and the upper body member so that any load on the connector as it is being placed in the wellhead will be transferred to the upper body member. The means for actuating the cam ring are hydraulic cylinders.

The state of the art also includes WO 2010099269, which discloses a subsea connector having an adapter ring that is capable of connecting the spool body to the connector. The connector assembly may be lowered onto a wellhead member and locked into place by a movable piston and split lock ring. While the connector assembly is in the unlocked state, the adapter ring may be rotated, moving the connector up or down with respect to the spool body, which lands on the wellhead member. The connector assembly is not locked to the wellhead member until the connector piston is moved to a locked position within an internal cavity of the connector. The movement of the connector may be used to vary the alignment of the connector locking means with respect to the locking profile of the wellhead member. This change in position may be used to modify the preload force applied to the connector when locked onto the wellhead member.

Thus, in the prior art, the first set of camming surfaces serves primarily to pivot the collet segments towards the wellhead hub (the second set performing the clamping operation), and the connector assembly is not locked to the hub until a connector piston subsequently is moved to a locked position.

The connectors of the prior art are limited in their ability to enter the hub at a large deflection angles and are limited with respect to the level of pre-tension that may be applied to the connector. Also, the collet fingers of the known connectors are prone to excessive wear and tear when aligning the connector with the hub, because of the manner in which the fingers are pre-tensioned.

The present applicant has devised and embodied this invention in order to overcome these shortcomings and to obtain further advantages.

SUMMARY OF THE INVENTION

It is thus provided a connector, comprising a plurality of latching fingers arranged around a cylindrical body having a central axis; each finger having a first end region extending beyond an end of the body and comprising a first latching structure; each finger being pivotally supported at an intermediate region by a portion of the body and being movable between a non-latching position and a latching position in which the first end region is closer to the central axis than in the non-latching position; the connector further comprising a first actuating member arranged in contact with the plurality of fingers and operable to move the fingers between the non-latching position and the latching position; characterized by an actuating means operable to force a second end region of each finger towards the body.

The actuating means may be configured to be operated independently of the first actuating member when the fingers are in a latching position. The first actuating member and the actuation means may also be configured for sequential or collective operation.

In one embodiment, each finger comprises a first seat in which the first actuating member is positioned when the finger is in a non-latching position; and wherein each finger furthermore comprises a first surface in the first end region configured for interaction with the first actuating member when the finger is in a latching position. The first seat is in one embodiment closer to the body central axis than the first surface is.

The actuating means is configured for exerting a pressure onto at least a portion of the second end region.

In one embodiment, the actuating means comprises a force-imparting member and the second end region comprises a force-receiving region; said force-imparting member and force-receiving region being configured for mutual cooperation. In one embodiment, the force-receiving region comprises a second surface which is curved radially outwardly in the finger longitudinal direction, with an apex, and comprises a trough for accommodating the force-imparting member; said trough being arranged in a region towards the intermediate region. The second surface may alternatively have a flat surface (and no apex) before the trough.

The seat comprises an abutment portion configured for interaction with a portion of the first actuating member when the first actuating member is in a retracted, non-latching, position, and the body comprises a first finger-locking structure configured for cooperation with a second finger-locking structure on the finger, whereby the finger is locked in a non-latching position when the first actuating member is in the retracted position.

In one embodiment, the first finger-locking structure comprises a slant body surface and the second finger-locking structure comprises a slant finger surface, said slant surfaces being configured for cooperation and arranged at a first rake angle with respect to a body cross-sectional plane and arranged such that the aft portion is forced towards the body central axis when the actuating member portion is forced against the abutment portion. In one embodiment, the body further comprises a shoulder having a second rake angle with respect to a body cross-sectional plane and configured for supporting interaction with a corresponding abutment face on the finger. In one embodiment, the slant finger surface and the finger abutment face are substantially parallel.

In one embodiment, the body comprises a connector face configured for abutment against a face on a hub, and the first latching structure on each finger is configured for latching interaction with a corresponding second latching structure on the hub; the body and the hub furthermore comprising respective through-going bores. In one embodiment, the connector face is a conical connector face, having a taper angle and the conical face extending to an apex at the opening of the through-going body bore. The hub and/or the connector may alternatively be formed without a through-going bore.

In one embodiment, the connector comprises an alignment control element configured for abutment against a hub abutment member; whereby a maximum misalignment angle between the connector and the hub during connection and disconnection is defined. In one embodiment, the first actuating member and the force imparting member are respective actuating rings surrounding the fingers.

The body support region is preferably in the region of said end of the body.

It is also provided a method of connecting a connector to a hub, the connector comprising a plurality of latching fingers arranged around a cylindrical body and having respective first latching structures, comprising the steps of
  a) bringing a connector face into contact with a hub face;
  b) moving the latching fingers towards the connector until the first latching structures engage in corresponding second latching structures on the hub, and then holding the latching structures together in a latching engagement; characterized by
  c) effecting a pressure in the aft region of each finger, towards the body, following the completion of step b).

In one embodiment, step b) comprises a sliding movement of a first actuating member from an intermediate region towards a first end region of each latching finger.

In one embodiment, step c) comprises a sliding movement of a force-imparting member onto a second end region of each latching finger. This movement may be made in a direction towards an intermediate region of the finger. Alternatively, this movement may be from the intermediate region, towards the second end region.

In one embodiment, the method comprises the movement of the force-imparting member into a recession on a surface on the finger.

The invention thus provides a dual-action connector having a first latching means whereby the latching fingers are brought into latching engagement with a hub, and a second latching means by means of which respective rear parts of the latching fingers are pressed against the connector body.

BRIEF DESCRIPTION OF THE DRAWINGS

These and other characteristics of the invention will be clear from the following description of a preferential form of embodiment, given as a non-restrictive example, with reference to the attached diagrammatic side view drawings wherein.

DETAILED DESCRIPTION OF A PREFERENTIAL EMBODIMENT

Figure 1:
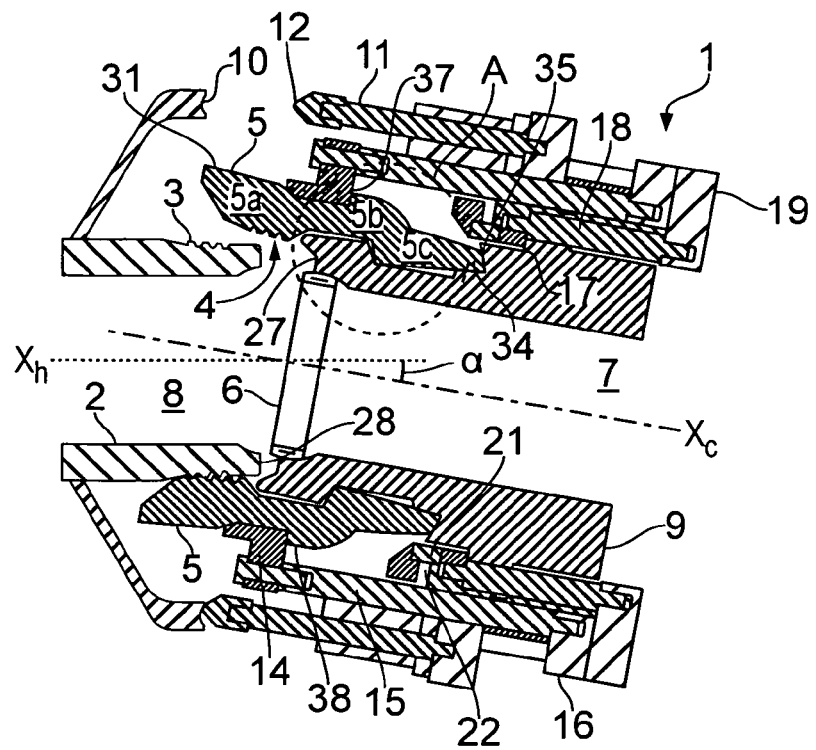
FIG. 1 is a cross-sectional drawing illustrating the invented connector in the process of entering, or separating from, a hub.

FIG. 1 illustrates an embodiment of the invented connector 1 in a transient docking stage, i.e. the connector being about to connect a first pipe (not shown) to a second pipe 2. The second pipe 2 may be connected to (or be an integral part of) subsea equipment, such as a wellhead, manifold, or x-mas tree (not shown) and comprises an internal bore 8 and a hub end having a grooved flange 3.

The invented connector comprises a cylindrical connector body 9 having an internal bore 7 with a packer 6, and may be connected to e.g. a pipeline, a riser, or a subsea equipment unit such as a blow-out preventer (not shown). The connector 1 comprises a number of collet segments—commonly referred to as "fingers"—5 having grooves 4 which are designed to fit around the flange of the hub end with the grooved flange 3. The fingers 5 are distributed around the connector body outer circumference in a manner which is well known in the art.

Arranged around the connector body 9 is an alignment controller ring 12 supported by support rods 11 (of which two are shown in FIG. 1). The alignment controller ring 12 is configured for interaction with an abutment member 10 connected to the hub and which has a shaped section corresponding to the alignment controller ring profile. The alignment controller ring 12 and abutment member 10 in combination serve to control the misalignment angle $\alpha$ between the hub central axis $X_h$ and the connector central axis $X_c$. FIG. 1 illustrates a misalignment situation, and shows how the alignment controller ring and abutment member in effect may define a fulcrum for the connector during entry or removal.

Figure 5:
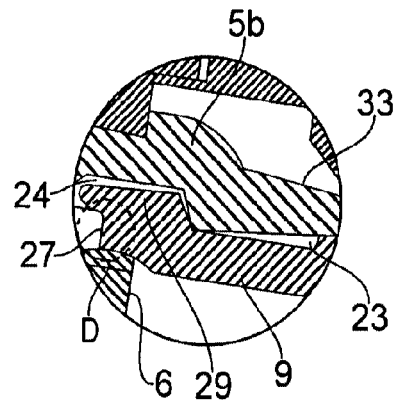
FIG. 5 is an enlargement of the region labelled "A" in FIG. 1.

Each finger 5 has a forward portion 5a (comprising i.a. the grooves 4), an intermediate portion 5b and an aft portion 5c. The forward portion comprises an outer surface 31. The intermediate portion 5b comprises an inner recessed region 24 (see FIG. 5) which accommodates an outer rim 29 on the connector body 9. The intermediate portion also comprises a seat 30 (see FIGS. 2 and 3). The side of the aft portion 5c which is facing the connector body is tapered away from the body, and the connector body comprises a recessed portion 23 in the vicinity of the aft portion 5c. The finger's rear surface 34 is slant, with a rake towards the intermediate and forwards portions, such that the aft portion 5c terminates in a pointed end. The body has a slant surface 35 with a rake corresponding to that of the rear surface 34, and a lower surface 36 with a shape complementary to the aft body taper. This rear rake angle is denoted $\delta$ in the figures and shown in relation to the body cross-sectional plane (see e.g. FIGS. 2, 3 and 7). The slant and lower surfaces 35, 36 of the body thus define a receiving portion for the pointed end of the aft portion 5c.

Arranged around the fingers 5 is a first actuating member in the form of a holding ring 14 which is connected to actuators 16 via rods 15 (two shown in FIGS. 1-4). The actuators serve to pull the holding ring 14 into the seat 30 when the fingers are in the open (non-latching) position. The seat 30 is arranged at a lower level (i.e. closer to the body) than the outer surface 31. In this position of the fingers, the holding ring rear face 37 is seated against an abutment portion 38 in the seat 30, thereby pressing the pointed end of the aft portion 5c into the receiving portion defined by the slant and lower surfaces 35, 36. The holding ring 14 being maintained in this (retracted) state hence in effect serves to lock the fingers in an open (non-latching) position; each finger being supported in the receiving portion and by the rear face 37.

Figure 8:
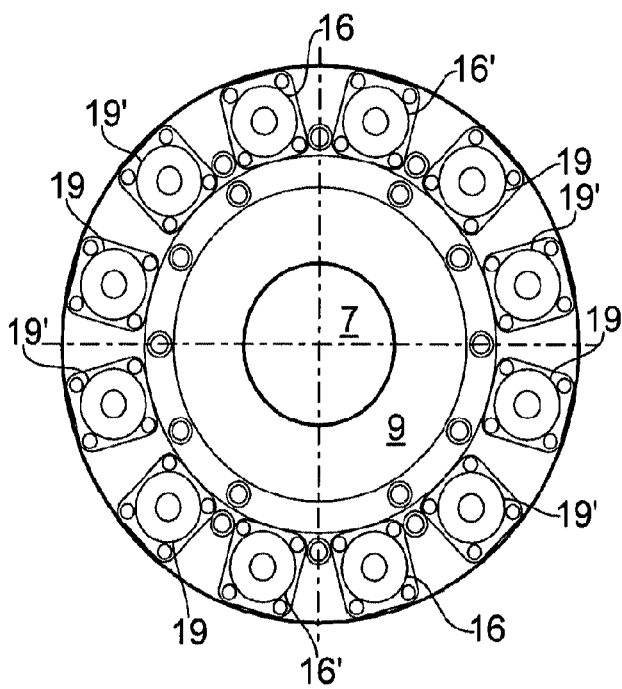
FIG. 8 is an end view of the connector, illustrating an arrangement of the actuators.

Arranged around the fingers 5 is also an actuation means in the form of a locking ring assembly 17 which is connected to actuators 19 via rods 18. Referring momentarily to FIG. 8, the holding ring 14 is operated by two actuators 16, while the required redundancy is catered for by two back-up actuators 16'. The locking ring assembly 17 is operated by four actuators 19, while the required redundancy is catered for by four back-up actuators 19'.

Figure 2:
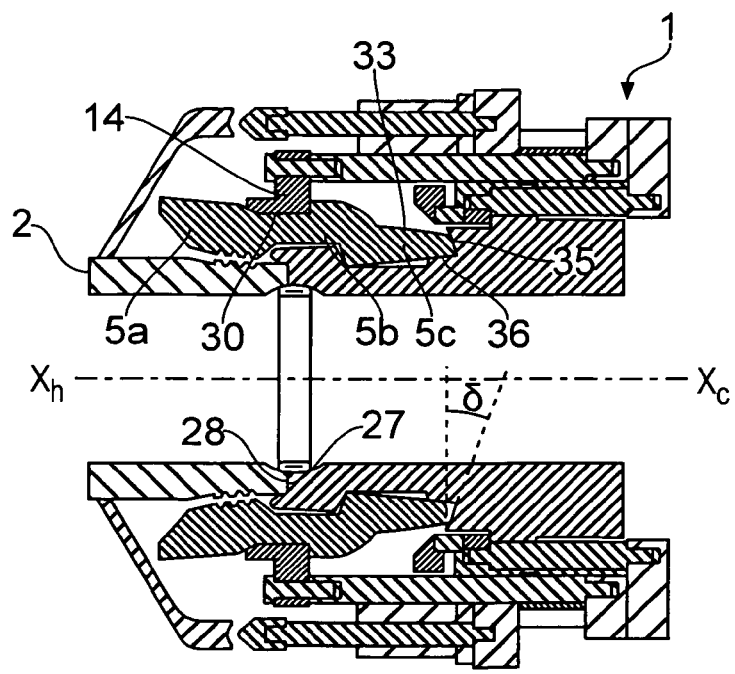
FIG. 2 is a cross-sectional drawing illustrating the connector in at fully landed position on the hub.

FIG. 2 illustrates the connector 1 in a fully landed position on the hub 2. The fingers are still in an open state (similar to that of FIG. 1). The connector face 27 and the hub face 28 have been brought together and the axes $X_h$ and $X_c$ are shown in an aligned state. It should be understood, however, that a complete alignment between these axes is not a prerequisite for commencing the locking sequence. The design of the fingers and holding ring, as will be described below, allows for a small deviation between the axes (e.g. 1° to 2°). An extension of the holding ring rods 15 to move the holding ring 14 into a latching position, will align the axes $X_h$ and $X_c$.

Figure 3:
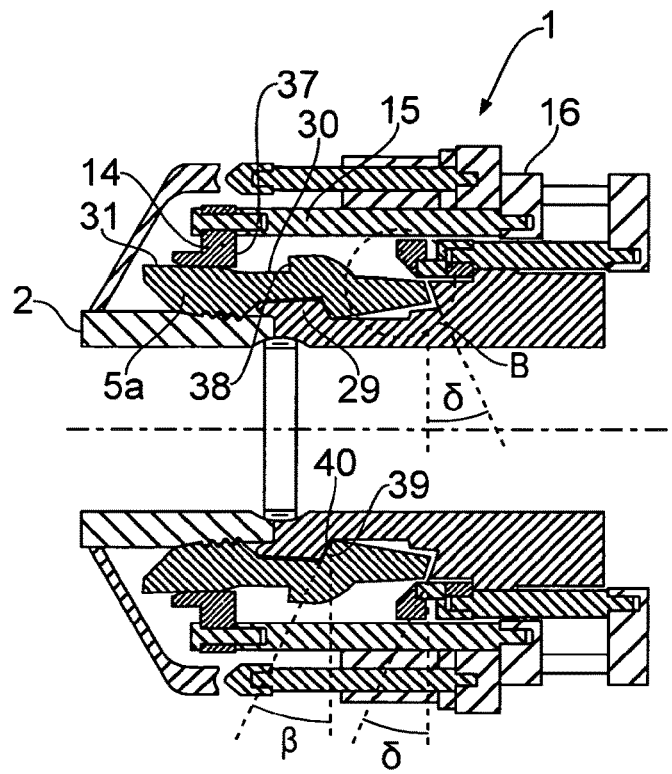
FIG. 3 is a cross-sectional drawing illustrating the connector partly locked to the hub.

FIG. 3 illustrates a first step in the process of locking the connector to the hub. The holding ring 14 has been moved (by operating the actuators 16 and extending the rods 15) from its non-latching position in the seat 30, along the outer surface 31, and to a position on the outer surface on the forward portion 5a of the finger. This movement of the holding ring 14 forces the pointed end of the aft portion 5c (notably the slant rear surface 34) to travel along the slant surface 35 to the position shown in FIGS. 3 and 6. This travel will, by virtue of the slant surfaces 34, 35 serve to move (push) the finger in a direction towards the connector face 27 (i.e. to the left in FIG. 3). This movement is counteracted by a forward abutment face 39 on the finger bearing against a shoulder 40 on the body. The shoulder 40 has a rake angle β with respect to the body cross-sectional plane (see also FIG. 7). Thus, by in effect forcing the aft portion 5c (abutment face 39) towards the shoulder 40, the finger is locked in a latching position. The minor misalignment between the axes $X_h$ and $X_c$ mentioned above is corrected during this operation.

Thus, when the first latching step has been completed in the manner described above (FIG. 3), the grooves 4 on the fingers are brought into a gripping engagement with the grooved flange 3.

Figure 4:
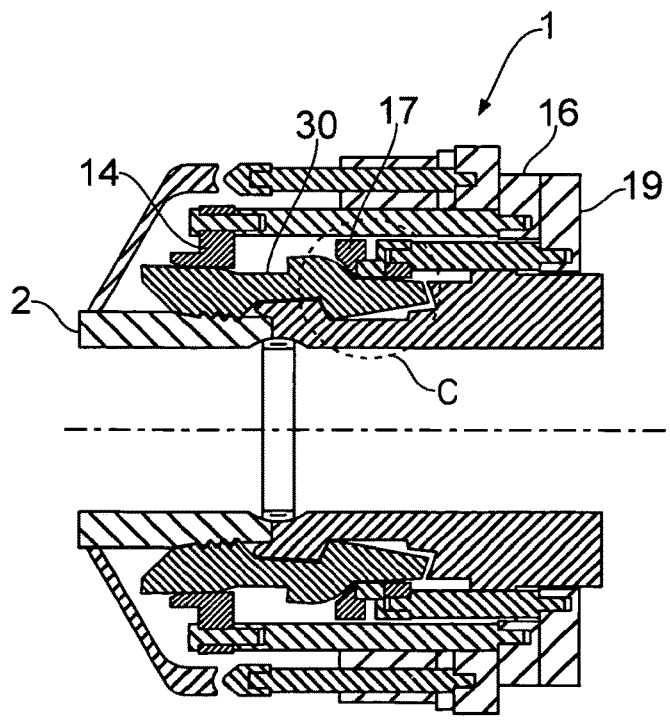
FIG. 4 is a cross-sectional drawing illustrating the connector fully locked to the hub.
Figure 7:
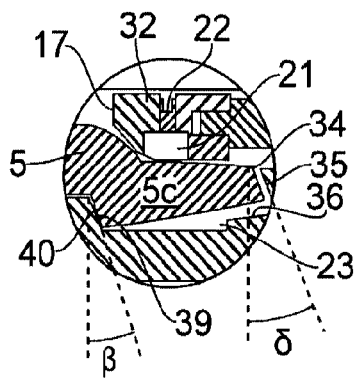
FIG. 7 is an enlargement of the region labelled "C" in FIG. 4.

FIG. 4 illustrates a second, and final, step in the process of locking the connector to the hub. The locking ring assembly 17 has been moved by the actuators 19 and rods 18 from its retracted position to an extended position on the fingers. Referring to FIG. 7, the locking ring assembly 17 comprises a carrier ring 32 having a groove holding a locking ring 21. There is a small amount of play between the groove walls and the locking ring 21, such that the locking ring to some extent is movable and allowed to expand when the locking ring assembly is moved back and forth along the aft portion 5c.

Figure 6:
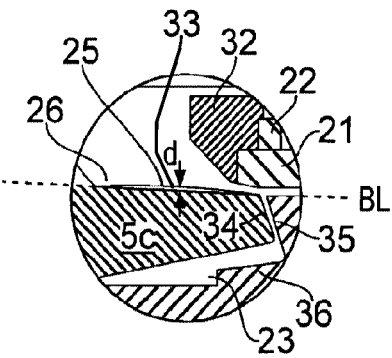
FIG. 6 is an enlargement of the region labelled "B" in FIG. 3.

Referring additionally to FIG. 6, the outer surface 33 of the aft portion 5c is curved. The outer surface 33 has an apex 25, with a height d above a finger baseline BL, between the aft tip of the finger and a trough 26, into which trough the locking ring is seated when in the locked position. When the locking ring assembly 17 is moved from the position shown in FIG. 3 to the position shown in FIG. 4, the locking ring 21 (which is the only part of the locking ring assembly in contact with the aft portion 5c) is subjected to high stresses due to the apex 25, and possibly also due to material imperfections and contaminations on the aft portion 5c. These stresses will exceed the locking ring 21 yield stress and bring the locking ring material into the elastic range. The resulting expansion is accommodated by the above mentioned play between the groove walls and the locking ring. Supporting screws 22 evenly distributed around the groove perimeter (one shown in FIG. 7) are adjusted to control the locking ring's expansion in the outward radial direction, and thus prevent further yielding. It is therefore normally only necessary to make this screw adjustment when the connection is made up for the first time. When the supporting screws are set in this manner, the locking ring's expansion is determined for the particular connector-hub constellation. The locking ring yielding will effectively account for any tolerances in the components used in the locking (e.g. fingers, holding ring, hub, and body).

Thus, the locking ring 21 is firmly seated in the trough 26 when the locking ring assembly 17 is in the locked position. A force is required to retract the locking ring assembly (across the apex), and the connector is hence in effect a fail-safe connector, inasmuch as inadvertent unlocking is prevented in the event that e.g. the actuators should fail.

It should be appreciated that the rake angle in combination with the curved surface 33 (with apex 25) makes a high pre-load between the connector face 27 and hub face 28 possible. Separating the connector from the hub is performed in a procedure essentially reversed compared to the connection procedure described above. First, the locking ring assembly is retracted, followed by retraction of the holding ring. The retraction of the holding ring will force the rear face 37 against the abutment portion 38 in the seat 30, and press the pointed end of the aft portion 5c into the receiving portion defined by the slant and lower surfaces 35, 36. The fingers 5 are now effectively locked in the open (non-latching) position shown in FIGS. 1 and 2.

Figure 9:
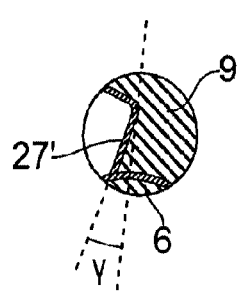
FIG. 9 is an enlargement of the region labelled "D" in FIG. 5, illustrating an alternative embodiment of the connector face.

Referring again to FIG. 1, illustrating misalignment during connection or separation, it is operationally advantageous to establish hub-to-connector contact as early as possible (during connection) and maintain this contact for as long as possible (at separation). This is achieved by establishing/maintaining contact near the packer 6. FIG. 9 illustrates an embodiment that achieves this end. In this embodiment, the connector face 27' is slightly conical, with its apex in the region near the packer 6. In FIG. 9, the taper angle γ is considerably exaggerated for illustration purposes.

The invention provides a two-step locking sequence; first bringing the finger grooves into locking engagement with the grooved flange by extending the holding ring, then locking the fingers against the connector body by extending the locking ring assembly.

The invention allows a comparably large misalignment angle α (see FIG. 1), as much as 10°, allowing connection to e.g. a damaged and misaligned subsea x-mas tree.

The operations described above may be performed remotely, and via known communications and power means. Required power supply lines, hydraulic lines, etc. have not been illustrated, as such items are well known in the art.

Although the embodiment described above uses an alignment controller ring 12 supported by rods 11, the skilled person will understand that equivalent means, e.g. pegs or semi-circular sections may be used instead. Such means are well known in the art.

Although the embodiment described above pertains to a connector and a hub having circular cross-sections, it should be understood that the invention is equally applicable to other cross-sectional shapes.

Although the embodiment described above comprises a curved aft portion 5c, having a surface 33 with an apex 25 and a trough 26, it should be understood that the invention also applies to other means for pressing the locking ring towards the finger.

The skilled person will understand that although the figures show the axes in a substantial horizontal plane, any other orientation may be equally relevant; e.g. a vertical orientation when landing a blow-out preventer on a wellhead.

The invention claimed is:

1. A connector which comprises:
   a cylindrical body having a central axis;
   a plurality of longitudinal latching fingers arranged around the body, each finger having a first end region which extends beyond a forward end of the body and comprises a first latching structure, a second end region and an intermediate region which is located between the first and second end regions;
   wherein each finger is pivotally supported at the intermediate region by a support portion of the body and is movable between a non-latching position and a latching position in which the first end region is located closer to the central axis than in the non-latching position;
   an actuating member arranged in contact with the plurality of fingers and being operable to move the fingers between the non-latching position and the latching position; and
   an actuating means operable to force the second end region of each finger towards the body by exerting a force on at least a portion of the second end region, the actuating means comprising a force-imparting member which cooperates with a force-receiving region located on the second end region;
   wherein the force-receiving region comprises a first outer surface portion which is curved radially outwardly in a longitudinal direction of the fingers to define an apex and a trough, the trough being configured to accommodate the force-imparting member and being located between the apex and the intermediate region.

2. The connector of claim 1, wherein each finger comprises a seat in which the actuating member is positioned when the finger is in the non-latching position and a second outer surface portion which is located in the first end region and is configured for interaction with the actuating member when the finger is in the latching position.

3. The connector of claim 2, wherein the seat is located closer to the central axis of the body than the second outer surface portion.

4. The connector of claim 2, wherein the seat comprises an abutment portion which is configured for interaction with a portion of the actuating member when the actuating member is in the non-latching position, and wherein the body comprises a first finger-locking structure which is configured for cooperation with a second finger-locking structure on the finger to thereby lock the finger in the non-latching position when the actuating member is in a retracted position.

5. The connector of claim 4, wherein the first finger-locking structure comprises a slant body surface and the second finger-locking structure comprises a slant finger surface, and wherein said slant surfaces are configured for cooperation, are arranged at a first rake angle with respect to a cross-sectional plane of the body, and are arranged such that the second end region is forced towards the central axis of the body when the actuating member portion is forced against the abutment portion.

6. The connector of claim 5, wherein the body further comprises a shoulder having a second rake angle with respect to a cross-sectional plane of the body, said shoulder being configured for supporting interaction with a corresponding abutment face on the finger.

7. The connector of claim 6, wherein the slant finger surface and the finger abutment face are substantially parallel.

8. The connector of claim 1, wherein the body comprises a connector face which is configured for abutment against a face of a hub to which the connector is to be latched, wherein the first latching structure of each finger is configured for latching interaction with a corresponding second latching structure on the hub; and wherein the body and the hub comprise respective through-going bores.

9. The connector of claim 8, wherein the connector face comprises a conical configuration having a taper angle and extends to an apex at the opening of the through-going bore of the body.

10. The connector of claim 8, further comprising an alignment control element configured for abutment against a hub abutment member.

11. The connector of claim 1, wherein the actuating member and the actuating means comprise respective actuating rings which are positioned around the fingers.

12. The connector of claim 1, wherein the support portion of the body is located at or adjacent the forward end of the body.

13. A method of connecting a connector to a hub, the connector comprising a plurality of longitudinal latching fingers arranged around a cylindrical body, each finger comprising a first end region which extends beyond a forward end of the body and comprises a first latching structure, a second end region and an intermediate region which is located between the first and second end regions, the method comprising the steps of:
   a) bringing a connector face into contact with a hub face;
   b) moving the latching fingers towards the hub until the first latching structures engage corresponding second latching structures on the hub;
   c) holding the first and second latching structures together in latching engagement; and
   d) effecting a pressure towards the body in the second end region of each finger following the completion of step c).

14. The method of claim 13, wherein step c) comprises sliding a first actuating member from the intermediate region of each finger towards the first end region of each finger.

15. The method of claim 13, wherein step d) comprises sliding a force-imparting member onto the second end region of each finger.

16. The method of claim 15, further comprising moving the force-imparting member into a trough located on an outer surface of each finger.

\* \* \* \* \*